Sept. 16, 1969 H. MAGNUSKI 3,467,783

SPEECH BANDWIDTH REDUCTION BY SAMPLING 1/N CYCLES STORING THE SAMPLES, AND READING THE SAMPLES OUT AT 1/N THE SAMPLING RATE

Filed Aug. 18, 1964 4 Sheets-Sheet 1

Inventor
Henry Magnuski

BY Mueller and Aichele

Attys.

Inventor
Henry Magnuski
BY Mueller and Aichele
Attys.

Inventor
Henry Magnuski
BY
Mueller and Aichele
Attys.

Inventor
Henry Magnuski
BY Mueller and Aichele
Attys.

United States Patent Office 3,467,783
Patented Sept. 16, 1969

3,467,783

SPEECH BANDWIDTH REDUCTION BY SAMPLING 1/N CYCLES STORING THE SAMPLES, AND READING THE SAMPLES OUT AT 1/N THE SAMPLING RATE

Henry Magnuski, Glenview, Ill., assignor to Motorola, Inc., Chicago, Ill., a corporation of Illinois Filed Aug. 18, 1964, Ser. No. 390,395
Int. Cl. H04b *1/66*
U.S. Cl. 179—15.55 9 Claims

ABSTRACT OF THE DISCLOSURE

Every Nth cycle of a speech waveform is sampled at a first predetermined rate and the samples thus obtained are stored in a memory. The stored samples are read out at a rate equal to $1/N$ times the first predetermined rate, thus increasing the period of each cycle to thereby reduce the bandwidth of the electrical signals. Reconstruction of the signals is accomplished by sampling the bandwidth compressed signal at a second predetermined rate, storing the samples in a memory, reading out the samples at a rate N times the second predetermined rate to reconstruct the signal expanded in bandwith and repeating such readout an average of N times for each cycle.

By reducing the bandwidth required for the transmission of an electrical signal more channels can be obtained in a given portion of the radio spectrum, the signal to noise ratio can be improved, and more efficient use is made of the radio frequency spectrum. Speech waveform is composed of many slowly changing cycles so that successive cycles differ very little. In order to convey the information contained in the speech signal it is only necessary that one of many nearly redundant cycles be transmitted. By eliminating the redundant information in the speech signal the bandwidth of the transmitted signal can be compressed. Prior art devices for speech compression have used complicated filtering and/or recording and indiscriminate chopping of the speech signal to accomplish the elimination of redundant information, and by so doing have introduced transients and distortion, so that the speech transmitted is difficult to recognize.

Accordingly, it is an object of this invention to provide a communication system wherein a speech signal is sampled to provide components for transmission over a channel of substantially reduced bandwidth. The bandwidth is reduced by an integral amount.

Another object of this invention is to provide a communication system wherein a speech signal is compressed in bandwidth transmitted and expanded without the introduction of distortion.

Another object of this invention is to provide a communication system wherein the bandwidth of a speech signal is compressed and expanded by simple digital circuits.

Another object of this invention is to provide a communication system for reducing the bandwidth of a transmitted speech signal and wherein the speech signal can be reconstructed so that the voice of the speaker is recognizable.

Another object of this invention is to provide a communication system in which a speech signal having its bandwidth compressed will have the same energy vs. frequency spectrum as the original speech signal.

A feature of this invention is the provision of a communication system with means for periodically selecting a single cycle of the speech signal to be transmitted, with a fixed number of omitted cycles between the selected cycles.

Another feature of this invention is the provision of a communication system with means for temporarily storing samples of the selected cycles.

Another feature of this invention is the provision of a communication system with means for receiving the lengthened transmitted cycles, reducing the period thereof to correspond to the cycles of the original speech signal and repeating the restored cycles a fixed number of times.

This invention is illustrated in the drawings wherein FIGS. 1, 2, and 3 are drawings of waveforms illustrating the operation of the system;

In practicing this invention a transmitter is provided in which every Nth cycle of the speech signal, whose bandwidth is to be compressed, is selected for transmission. The voltage waveform of the cycle selected is sampled at a high rate and the sample voltage are stored in a temporary memory register. The voltage samples of the speech signal stored in the memory register are read out at a rate $1/N$ times the input rate and are used to construct a new analog signal waveform which closely approximates the original speech signal but with the period increased N times. The bandwidth of the resulting signal is thus $1/N$ times the bandwidth of the original speech signal.

At the receiver the voltage waveform of each received cycle is sampled at a slow rate and each voltage sample is stored in a memory register. As soon as the voltage samples representing a complete cycle are stored they are read out at a fast rate, N times the slow rate, and are used to construct a signal waveform having the same period as the original selected cycle of the speech signal and closely approximating its waveform. This reconstructed signal is repeated an average of N times during the time that the subsequent received cycle is stored in the memory register. Each subsequent received cycle is read out of the memory registers at the fast rate and repeated an average of N times, so that a relatively smooth voice waveform is obtained which closely approximates the original speech signal, but which has been transmitted over a bandwidth N times smaller than the bandwidth of the original speech signal.

Because of the redundancy of speech signals, it is possible to transmit only one of several successive cycles without losing necessary speech information. As an example, every fourth cycle may be transmitted in the system described without producing objectionable distortion. The system is not limited to a four times frequency compression and any compression ratio consistent with the requirements of the system can be used.

Figure 1:
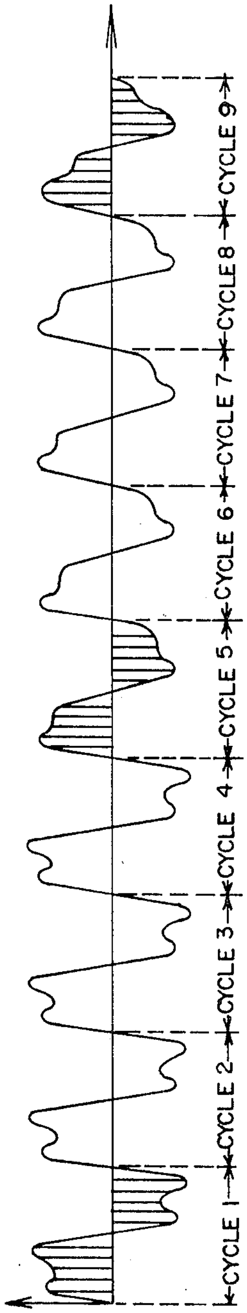

FIG. 1 shows a portion of the speech waveform from which cycle 1, cycle 5 and every subsequent fourth cycle have been selected for transmission. The voltage waveform of cycle 1, and every subsequent selected cycle, is sampled at a fast rate and the voltages present in the cycle at the times of sampling are stored in a memory register. The times of sampling are indicated by the vertical lines on FIGS. 1, 2 and 3. The voltage samples are read out of the memory register at a slow rate, which is one-fourth of the fast rate, and are used to construct the waveform shown in FIG. 2. The waveform of cycle 1 in FIG. 2 has substantially the same shape as the waveform for cycle 1 of FIG. 1 but its period is four times as long and therefore its bandwidth is one-fourth that of cycle 1 of FIG. 1. Every fourth cycle of the original speech signal shown in FIG. 1 is thus expanded in time and transmitted as a continuous signal.

Figure 2:
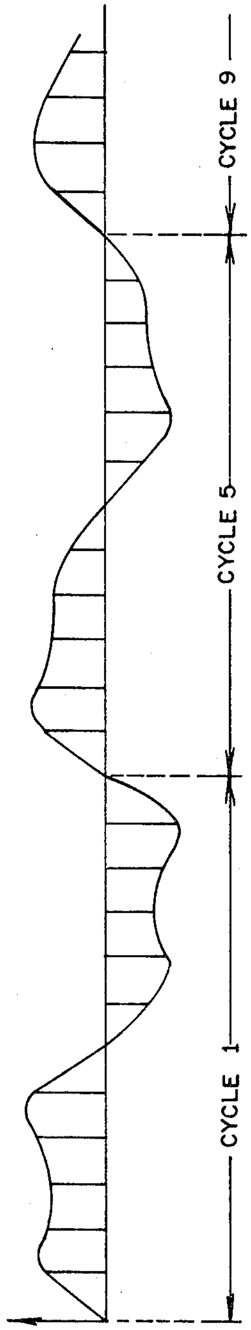
Figure 3:
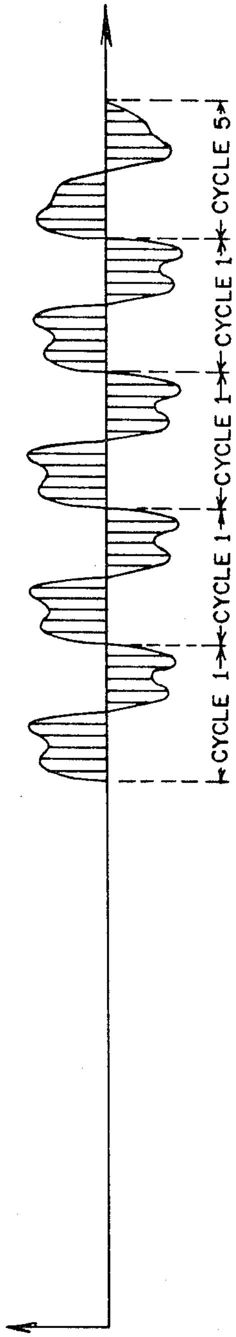

The signal illustrated in FIG. 2 also represents the signal as received at the receiver. The voltage waveform of this signal is again sampled at a slow rate and the voltage samples thus obtained are stored in a memory register. After the first cycle has been stored it is read out of the memory register at a rate 4 times the input rate. Thus the wave is reconstructed with a period one-fourth of the period of the received wave. The reconstructed wave is repeated four times so that the resulting series of cycles consists of four identical cycles each having one-fourth the period of the reecived cycle and four times its bandwidth. During the period that cycle 1 has been read out of the memory register four times cycle 5, the next cycle received, is stored in another portion of the memory register. At the completion of the read out of cycle 1, cycle 5 is read out four times. Every subsequent cycle received is stored in the memory and read out four times with its bandwidth increased four times. The signal thus produced is shown in FIG. 3. Since the original speech signal differed very little from cycle to cycle the reconstructed speech signal in FIG. 3 closely approximates the original speech signal shown in FIG. 1. However, by transmitting only every fourth cycle over the time period required for four cycles, the transmission bandwidth has been reduced by a factor of four. The sampling rates at the transmitter and the receiver do not have to be synchronized, and different rates can be used.

Figure 4:
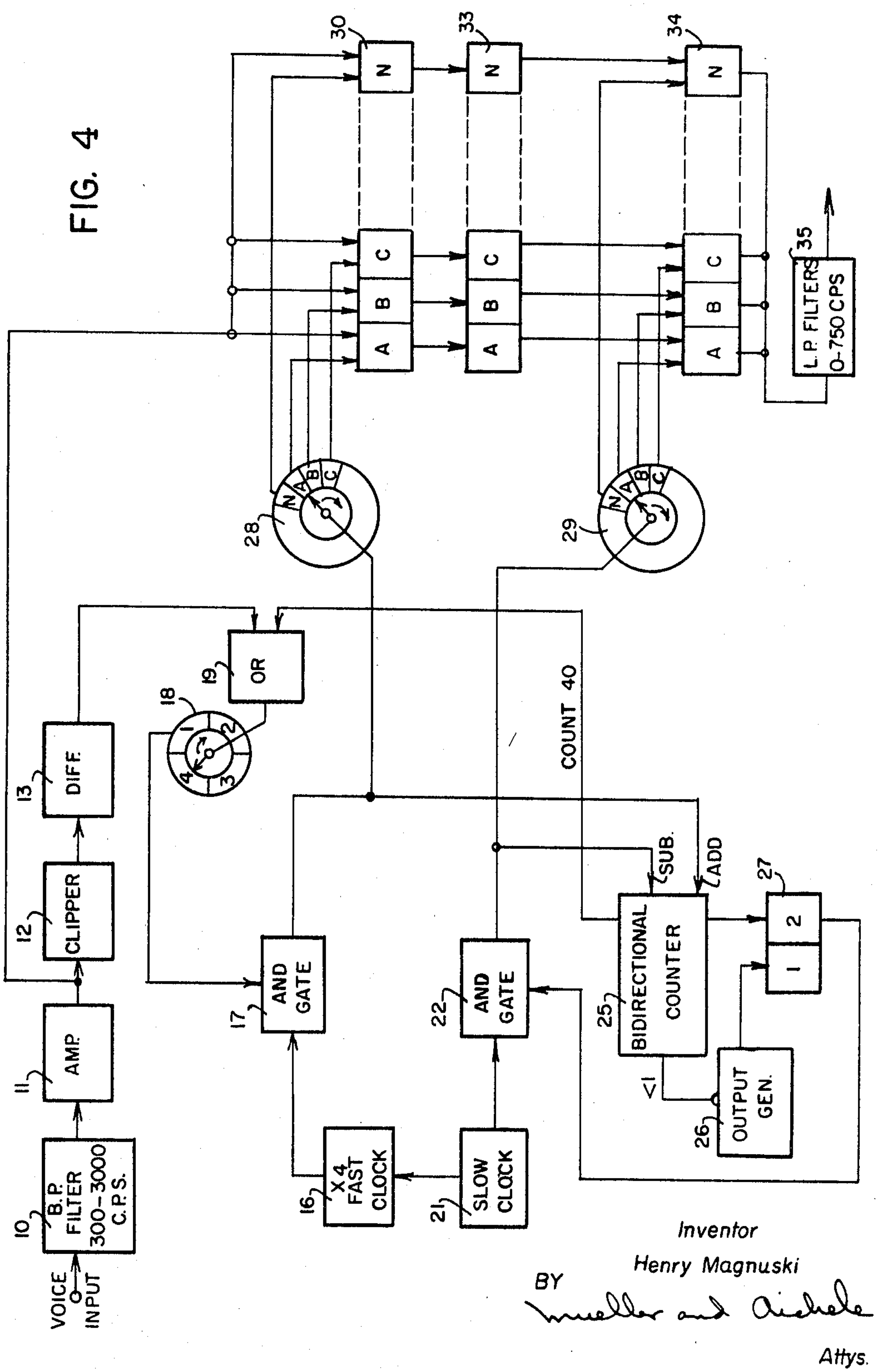
FIG. 4 is a block diagram of the system for compressing the bandwidth of a speech signal.

A block diagram of a portion of a transmitter incorporating the features of this invention is shown in FIG. 4. A speech signal is applied to bandpass filter 10 which attenuates components of the speech signal outside the passband of 300 to 3,000 cycles per second. Lower frequencies would require proportionally larger memory storage as the cycles would be sampled over a longer period of time. Higher frequencies would require a faster sampling rate again increasing the size of the memory storage required. The speech signal is amplified in amplifier 11 and the amplified speech signal is applied to the input gate 30 of memory 33. The amplified speech signal from amplifier 11 is also applied to clipper 12 which produces a rectangular output signal having the same period as the speech signals applied thereto. The output of clipper 12 is differentiated in differentiator 13, thereby producing a pulse with every reversal of the rectangular signal. The negative pulses so produced are removed in differentiator 13 and only the positive pulses, which mark the beginning of each consecutive cycle, are coupled to OR gate 19. The output of OR gate 19 is applied to ring counter 18, each pulse causing ring counter 18 to advance one count.

A slow clock 21 generates timing pulses at a 3 kc. rate and applies them to AND gate 22 and to fast clock 16. Fast clock 16 multiplies the frequency of the timing pulses from slow clock 21 by four to generate a fast clock output having a 12 kc. pulse rate. The output of fast clock 16 is applied to AND gate 17. The ratio between the frequencies of the two clocks 16 and 21, determines the degree of compression to be obtained by the system.

When an output pulse from differentiator 13 is applied to ring shifter 18 through OR gate 19, it steps the ring shifter one position forward. When ring shifter 18 reaches position 1, the output signal thereby generated is applied to AND gate 17 turning on AND gate 17 and permitting the clock signals from fast clock 16 to be applied to ring shifter 28 and the bidirectional counter 25. Ring shifter 28 alternately opens gates A, B, C, . . . N of input gate 30. As each gate is opened the voltage, at that instant, of the speech signal from amplifier 11 is stored in the appropriate register of memory 33. This register could be a simple capacitor which is charged to a sampled speech voltage when diode gates are opened. The operation of ring shifter 28 continues as long as AND gate 17 is opened. At the end of one cycle of the speech signal a positive pulse is again generated by differentiator 13 and is applied to ring shifter 18 through OR gate 19. This shifts ring shifter 18 from position 1 to position 2 removing the enabling signal applied to AND gate 17, thus closing this AND gate. Ring shifter 18 is also shifted from position 1 to position 2 if the count in bidirectional counter 25 reaches 40, the number of memory register in memory 33. A "count 40" pulse from bidirectional counter 25 is coupled to ring shifter 18 through OR gate 19 to shift ring shifter 18 to the next position. Ring shifter 28 remains in the position it then occupies until it is again coupled to fast clock 16 by the action of ring shifter 18.

Bidirectional counter 25 receives each pulse from fast clock 16 through AND gate 17 and adds the pulse received. Pulses received from slow clock 21 through AND gate 22 are also applied to bidirectional counter 25 and these pulses are subtracted from the total contained within the bidirectional counter. AND gate 22 is controlled by bistable multivibrator 27 which is normally in its first stable state. When the first pulse is reecived by bidirectional counter 25 from fast clock 16, an output signal is developed which causes bistable multivibrator 27 to change to its second stable state. Bistable multivibrator 27 develops an output signal, in its second stable state, which turns on AND gate 22. The output of slow clock 21 is then applied to bidirectional counter 25 and to ring shifter 29. Ring shifter 29 is similar in operation to ring shifter 28 and its output consecutively opens the output gates 34 connected to memory 33. Since ring shifter 29 is operated by slow clock 21, it will open the output gates 34 at one-fourth the rate that ring shifter 28 will open the input gates 30. Thus the speech sample stored in the memory registers of memory 33 is read out at a rate which is one-fourth the rate at which it is stored. The samples stored in the memory register of memory 33 are used to reconstruct the signal which was sampled by the input gates 30. The signal thus reconstructed will have a period four times as long as the signal sampled by input gates 30 and thus one-fourth of its bandwidth. This output signal is filtered by low pass filter 35, passing frequencies below 750 c.p.s. in this example, to remove transients produced by the sampling action of the system and used to modulate a carrier wave signal for transmission.

The pulses from slow clock 21 coupled to bidirectional counter 25 through AND gate 22 are subtracted from the count contained in the bidirectional counter. When the count contained in bidirectional counter 25 becomes less than 1, an inhibiting signal from bidirectional counter 25, which is applied to output generator 26, is removed. Output generator 26 then produces an output signal which causes bistable multivibrator 27 to return to its first stable state. The signal from bistable multivibrator 27 is removed from AND gate 22 disabling the AND gate and stopping the operation of ring shifter 29.

The output compressed speech signal thus generated by the system shown in FIG. 4 will have bandwidth of from 75–750 c.p.s. This compressed speech signal is used to modulate a carrier wave and is transmitted. The transmitted signal is received and detected to recover the compressed speech signal.

Figure 5:
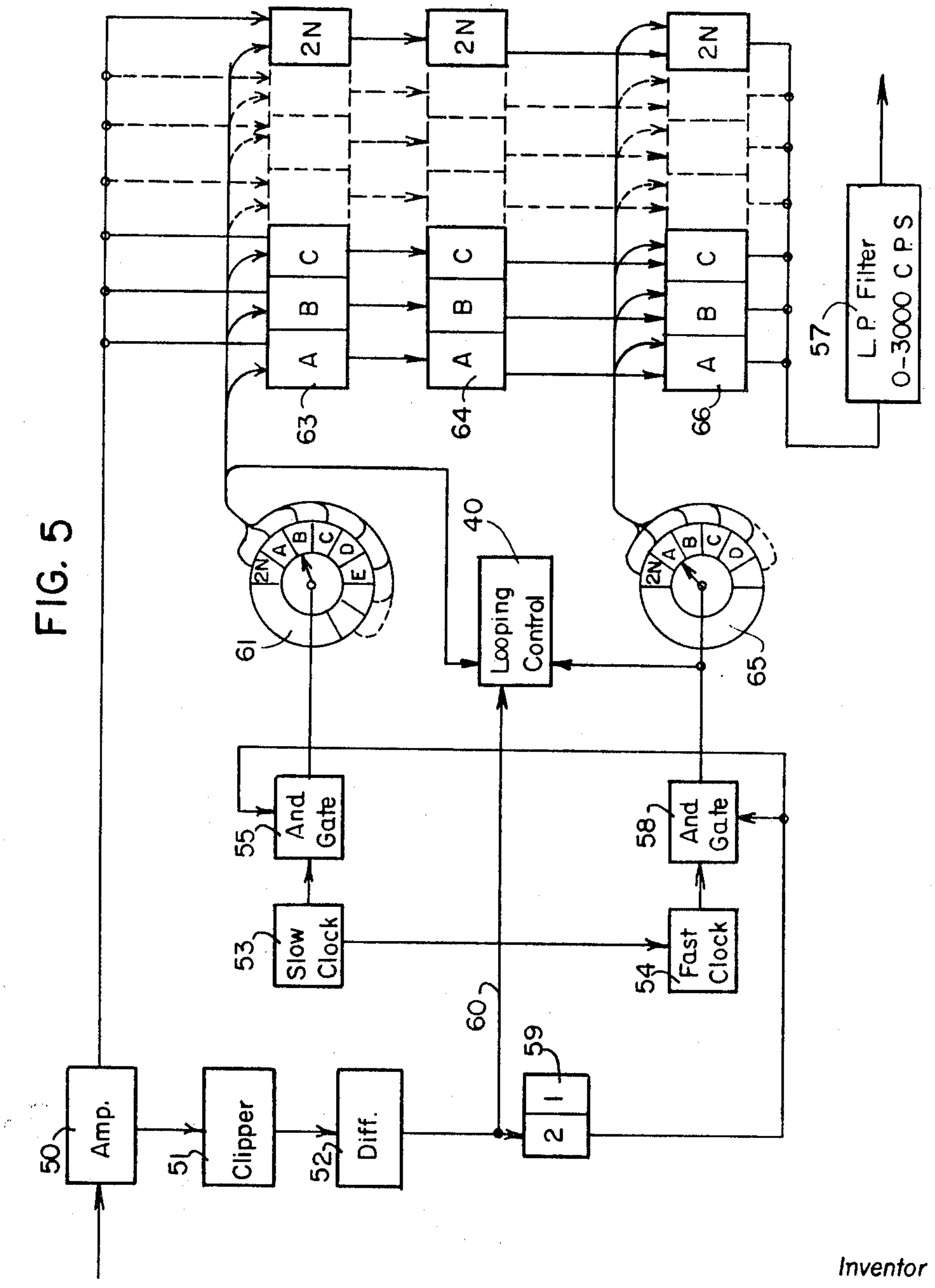
FIG. 5 is a block diagram of the system for expanding the bandwidth of a compressed speech signal.

FIG. 5 illustrates a receiver which replaces the nearly redundant cycles removed by the transmitter. An input signal containing the speech signal compressed in bandwidth by the transmitter shown in FIG. 4 is applied to amplifier 50. The output of amplifier 50 is applied to input gates 63 and also amplified in clipper 51 to form rectangular pulses which are differentiated by differentiator 52. The output of differentiator 52 consists of a pulse at the beginning of each of the cycles of the narrow bandwidth signal. These pulses are applied to monostable multivibrator 59 and the bus 60 of looping control 40. Monostable multivibrator 59 is normally in the first or stable state and is triggered to the second or unstable state by differentiator 52. In the absence of a triggering pulse monostable multivibrator 59 will remain in its second or unstable state for a period of time slightly greater than the longest period cycle which can be received by the system. At the end of this time the monostable multivibrator 59 reverts to its first stable state. In normal operation monostable multivibrator 59 is triggered to its second unstable state and is retriggered to this state by every subsequent cycle received. Thus it remains in the second unstable state until the received signals cease.

The output of multivibrator 59 is coupled to AND gates 55 and 58 which control the output of slow clock 53 and fast clock 54. As in the transmitter fast clock 54 is four times as fast as slow clock 53 and is synchronized with the slow clock. The output of slow clock 53 is coupled to ring shifter 61 through AND gate 55. When AND gate 55 is turned on the pulses from the slow clock step ring shifter 61 continuously.

The output of each stage of ring shifter 61 is coupled to the corresponding gate of input gates 63 and is used to control these gates. The gates A, B, C . . . to 2N are sequentially opened to sample the voltage of the waveform from amplifier 50 and to store this sampled voltage in the memory registers 64. Ring shifter 65 controls output gates 66 from the memory registers 64. These are opened in consecutive order to read out the samples stored in the memory registers. Ring shifter 65 is controlled by the pulses from fast clock 54 which occur at a rate four times as fast as the pulses controlling the input gates 63 to the memory registers 64.

The output signals from memory register 64 are used to reconstruct a voltage waveform substantially the same as the originally selected waveform and having the same bandwidth as the original signal. This output signal is filtered by low pass filter 57 passing up to 3000 c.p.s. to remove the sampling frequency. This reconstructed waveform is repeated four times by the looping control 40, whose operation will be subsequently explained, to replace the unsampled cycles of the original speech signal.

Figure 6:
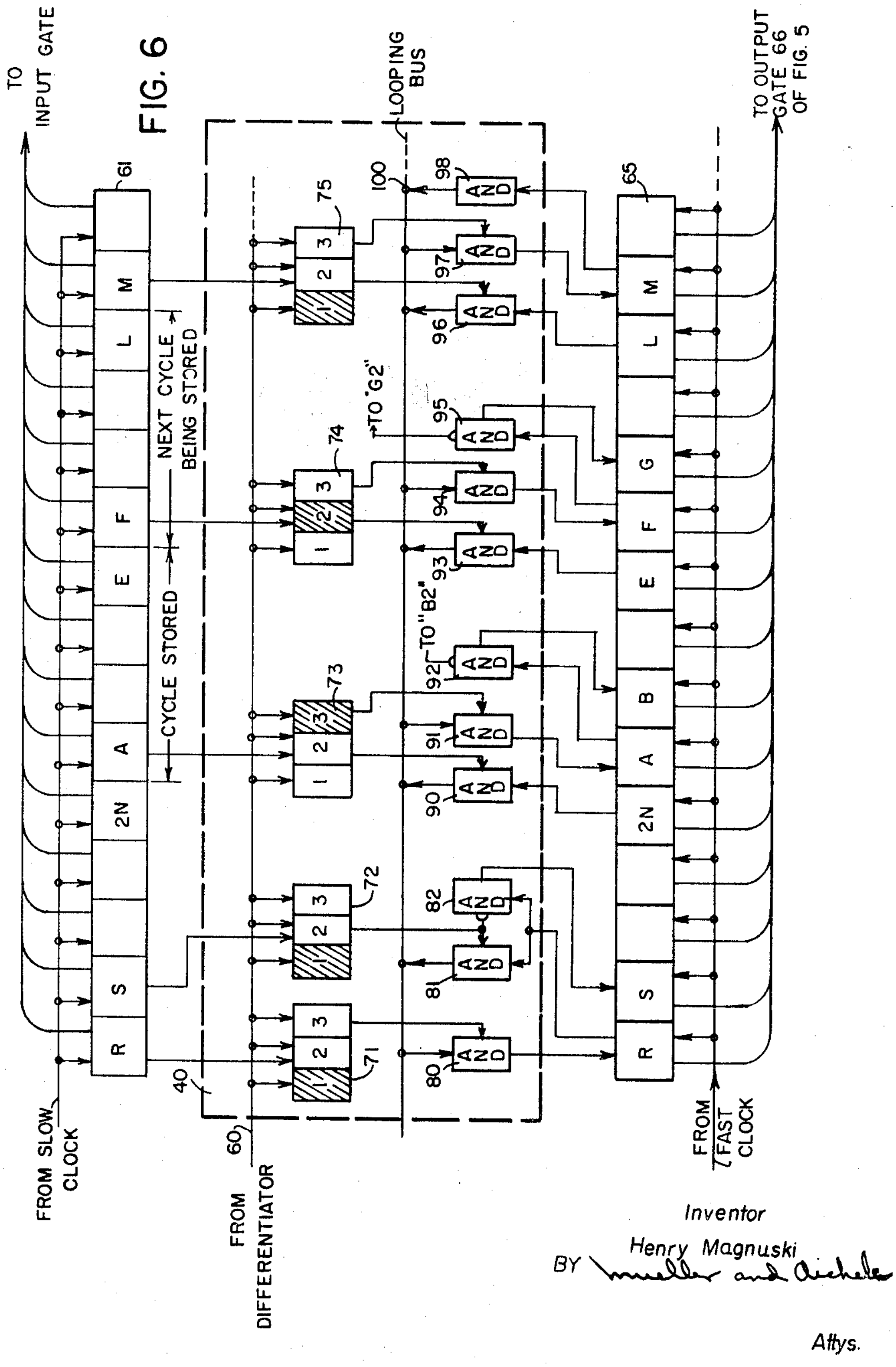
FIG. 6 is a block diagram of the looping control system.

Looping control 40 is illustrated in FIG. 6 and consists of a series of AND gates and three position shift registers. Each of the input ring shifter registers 61 A, B, C . . . through N has associated with it a three position shift register and three AND gates. Five of the three position shift registers are illustrated in FIG. 6. Shift register 71 associated with input ring shifter register R, shift register 72 associated with input ring shifter register S, shift register 73 associated with input ring shifter register A, shift register 74 associated with input ring shifter register F and shift register 75 associated with input ring shifter register M.

In operation the three position shift registers 71, 72, 73, 74 and 75 are normally in position 1. Each time a pulse is generated by differentiator 52 of FIG. 5 the pulse is coupled to each three position shift registers. If a three position shift register is in position 1, the pulse applied thereto has no effect on the three position shift register, unless at the same time a signal is applied to the three position shift register from the corresponding input ring shifter register. Referring to input ring shifter 61, register R and three position shift register 71, the three position shift register is shown in position 1. If a pulse from differentiator 52 of FIG. 5 is applied to the three position shift register 71 by bus 60 at the same time that input ring shifter 61 is in position R the combination of the pulse from differentiator 52 and a signal from position R of input ring shifter 61 will cause three position register 71 to shift to position 2. The next pulse from differentiator 52 will cause three position shift register 71 to shift to position 3 and the next pulse will cause the shift register to return to position 1, where it will remain until a pulse from differentiator 52 coincides with an input signal from position R of input ring shifter 61. Thus three position shift register 71 when triggered to position 2 will shift through all three of its positions and return to position 1. The operation of shift registers 72, 73, 74 and 75 is the same except that signals from different positions of input ring shifter 61 change three position shift registers 72, 73, 74 and 75 to position 2. However, once a three position shift register is shifted to position 2 it will continue through its cycle, actuated by subsequent differentiator pulses and independent of the position of input ring shifter 61.

Associated with each of the positions of output ring shifter 65 are three AND gates illustrated by AND gates 80, 81 and 82 associated with position R of output gate 65. AND gate 80 couples the output of ring shifter position R to looping bus 100 so that shift register position R can receive a signal from looping bus 100. AND gate 81 is connected to couple a signal from position R of output ring shifter 65 to looping bus 100. AND gate 82 is connected to couple a signal from position R of output ring shifter 65 to position S of output ring shifter 65. AND gate 80 is connected to position 3 of three position ring shifter 71, the three position shifter associated with the R position of the input and output ring shifter. AND gates 81 and 82 are connected to position 2 of the three position ring shifter 72 associated with the following shift position S.

In operation, with shift registers 71 and 72 in position 1 AND gate 82 would be open and AND gates 80 and 81 would be closed. Thus a signal from position R of ring shifter 65 would be coupled to position S of ring shifter 65. When the AND gates are thus connected ring shifter 65 steps from position to position in a normal manner. When three position ring shifter 72 is changed to position 2, an output signal from the three position ring shifter is coupled to AND gates 81 and 82 and enables AND gate 81 and inhibits AND gate 82. Thus the output signal from position R of shift register 65 is coupled to the looping bus 100 instead of the following stage of shift register 65. Because of the bandwidth restrictions of the system, adjacent three position ring shifters of looping control 40 cannot be in positions 2 or 3. Thus if three position ring shifter 72 is in position 2 or 3 the preceding and following three position ring shifters are in position 1. If three position ring shifter 71 is in position 3 and shift register 72 is in position 1 AND gates 80 and 82 are enabled and AND gate 81 is inhibited. Thus position R of output ring shifter 65 is coupled to looping bus 100 by AND gate 80 to enable the R position of output ring shifter 65 to receive a signal from looping bus 100. The output signal from position R of output ring shifter 65 is coupled to the following position S through AND gate 82.

In normal operation output ring shifter 65 is stepped from position to position by a series of pulses from fast clock 54. If all of the three position ring shifters 71, 72, 73, 74 and 75 remain in position 1 output ring shifter 65 would step through positions A through 2N and repeat the cycle indefinitely. However, the AND gates, as illustrated by the description of the operation of AND gates 80, 81 and 82, enable the stepping sequence to be looped back upon itself to repeat a series of the positions of output ring shifter 65. Assume for example a cycle has been stored while input ring shifter 61 has been stepped from position A through E. A pulse from differentiator 52 would have been received when input ring shifter 61 was in position A causing three position ring shifter 73 to be shifted to position 2. When input ring shifter 61 reaches position F, a second pulse from differentiator 52 is received signifying the beginning of a new cycle. This will cause three position ring shifter 74 to change to position 2 and three position ring shifter 73 to position 3 as shown by the shading in FIG. 6. During the time that input ring shifter 61 is being stepped from position F through L the information stored when input ring shifter 61 was being stepped from position A through E is being read out and output ring shifter 65 is stepped from position A through position E. When output ring shifter 65 reaches position E, the output signal from this position is coupled to looping bus 100 through AND gate 93 which is enabled by the output from position 2 of three position ring shifter 74. The output signal from position E is coupled to position A through the looping bus and AND gate 91 which is enabled by the output from position 3 of three position ring shifter 73. From position A output ring shifter 65 is stepped through positions A, B to E where it is again stepped back to position A through AND gates 93 and 91. This looping of shift register 65 is repeated until the next cycle is stored and an input to a subsequent three position ring shifter from the differentiator and input ring shifter 61 establishes a new set of positions of output ring shifter 65 which are to be looped. When this occurs the pulse from differentiator 52 shifts three position ring shifter 73 to position 1 and three position ring shifter 74 to position 3. AND gate 93 is no longer enabled and upon reaching position E output ring shifter 65 shifts to position F instead of returning to position A. Output ring shifter 65 will then proceed to loop through the next sequence of positions established as containing a stored cycle. Because of the timing involved, whereby subsequent cycles may be shorter or longer than the preceding cycles, it is possible to cycle three times or five times instead of the desired four times. However, this will occur only occasionally and the average number of recycles will be four as the readout of three cycles will be offset subsequently by a readout of five cycles. Any distortion introduced by this increase or decrease in the number of times output ring shifter 65 is looped will be negligible.

Thus a system has been shown incorporating digital techniques which will compress the bandwidth of a speech signal. The original bandwidth is restored at the receiver without appreciable distortion to produce a speech signal which closely approximates the original signal.

I claim:

1. A system for decreasing the transmission bandwidth of an electrical signal composed of a plurality of cycles, including in combination, first input means adapted to receive the electrical signal, first control signal generation means and first sampling means coupled to said first input means, first memory means coupled to said first sampling means, first read out means coupled to said first memory means, and first clock means coupled to said first control signal generation means, said first sampling means and said first read out means, said first control signal generation means being responsive to said electrical signal to generate a first control signal at the end of each cycle thereof, said first clock means being responsive to said first control signal to generate a series of first fast clock pulses having a first predetermined pulse rate during the period of every Nth cycle of the electrical signal, said first clock means being further responsive to said first fast clock pulses to generate a series of first slow clock pulses substantially equal in number to the number of first fast clock pulses generated and having a rate equal to $1/N$ times said first predetermined pulse rate, said first sampling means being responsive to said first fast clock pulses and to the potential of every Nth cycle of the electrical signal to couple a first plurality of waveform samples to said first memory means for storage therein, said first read out means being responsive to said first slow clock pulses to read out from said first memory means said first plurality of waveform samples and to construct therefrom a transmission signal having a waveform substantially the same as said sampled cycle and with a bandwidth $1/N$ times the bandwidth of said sampled cycle, transmission means coupled to said first read out means to transmit said transmission signal, second input means coupled to said transmission means for receiving and translating said transmission signal, second control signal generation means and second sampling means coupled to said second input means, second memory means coupled to said second sampling means, second read out means coupled to said second memory means, second clock means coupled to said second predetermined pulse rate and a series of second sampling means, and said second read out means, said second control signal generation means being responsive to said transmitted signal to generate a second control signal at the end of each cycle thereof, said second clock means being responsive to said second control signal to generate a series of second slow clock pulses having a second predetermined pulse rate and a series of second fast clock pulses having a rate equal to N times said second predetermined pulse rate during the period a transmission signal is being received, said second sampling means being responsive to said second slow clock pulses and to the potential of every cycle of said transmission signal to couple a second plurality of waveform samples to said second memory means for storage therein, said second read out means including looping control means coupled to said second control signal generation means and responsive to said second control signal to establish particular samples of said second plurality of waveform samples stored in said second memory means which represent the beginning and end of each cycle of said transmission signal, said second read out means being responsive to said second fast clock pulses to read out from said secondary memory means an average of N times said second plurality of samples representing each cycle of said transmission signal to construct an output signal in which each cycle of said transmission signal is repeated an average of N times and wherein the bandwidth of said output signal is substantially equal to the bandwidth of the electrical signal.

2. A system for decreasing the transmission bandwidth of an electrical signal composed of a plurality of cycles, including in combination, first input means adapted to receive the electrical signal, first control signal generation means coupled to said first input means, a plurality of first memory means, a plurality of first input gate means each coupling said first input means to a separate one of said first memory means, first output filter means, a plurality of first read out gate means each coupling a separate one of said memory means to said output filter means, first clock means coupled to said first control signal generation means, first input ring counter means and first output ring counter means each coupled to said first clock means and each having a plurality of outputs, each of said plurality of first input ring counter means outputs being coupled to a separate one of said plurality of first input gate means for sequential actuation thereof, each of said plurality of first output ring counter means outputs being coupled to a separate one of said plurality of first read out gate means for sequential actuation thereof, said first control signal generation means being responsive to said electrical signal to generate a first control signal at the end of each cycle thereof, said first clock means being reponsive to said first control signal to generate a series of first fast clock pulses having a first predetermined pulse rate during the period of every Nth cycle of the electrical signal, said first clock means being further responsive to said first fast clock pulses to generate a series of first slow clock pulses substantially equal in number to the number of first fast clock pulses generated and having a pulse rate equal to $1/N$ times said first predetermined pulse rate, said first input ring counter means being responsive to said first fast clock pulses to sequentially open and close said plurality of first input gate means whereby a first plurality of potential samples of every Nth cycle of the electrical signal are stored each in a separate one of said plurality of first memory means, said first output ring counter means being responsive to said first slow clock pulses to sequentially open and close said plurality of first read out gate means to couple said first plurality of potential samples from said plurality of first memory means to said first output filter means, said first output filter means being responsive to said plurality of potential samples to construct therefrom a transmission signal having a waveform substantially the same as said sampled cycle and with a bandwidth $1/N$ times the bandwidth of said sampled cycle, transmission means coupled to said first output filter means to transmit said transmission signal, second input means coupled to said transmission means for receiving and translating said transmission signal, second control signal generation means coupled to said second input means, a plurality of second memory means, a plurality of second input gate means each coupling said second input means to a separate one of said second memory means, second output filter means, a plurality of second read out gate means each coupling a separate one of said second memory means to said output filter means, second clock means coupled to said second control signal generation means, second input ring counter means and second output ring counter means each coupled to said second clock means and each having a plurality of outputs, each of said plurality of second input ring counter means outputs being coupled to a separate one of said plurality of second input gate means for sequential actuation thereof, each of said plurality of second output ring counter means outputs being coupled to a separate one of said plurality of second read out gate means for sequential actuation thereof, said second control signal generation means being responsive to said transmission signal to generate a second control signal at the end of each cycle thereof, said second clock means being responsive to said second control signal to generate a series of second slow clock pulses having a second predetermined pulse rate and a series of second fast clock pulses having a rate equal to N times said second predetermined pulse rate during the period said transmission signal is being received, said second input ring counter means being responsive to said second slow clock pulses to sequentially open and close said plurality of second input gate means whereby a second plurality of potential samples of every cycle of said transmission signal are stored each in a separate one of said plurality of second memory means, looping control means coupled to said second control signal generation means, said second input ring counter means and said second output ring counter means, said looping control means being responsive to said second control signal and said sequential actuation of said plurality of said second input gate means to establish the particular outputs of said second output ring counter means which represent the beginning and end of each cycle of said transmission signal and to establish a sequence of actuation for said second output ring counter means, said second output ring counter means being responsive to said series of second fast clock pulses to sequentially open and close said plurality of second read out gate means representing each cycle of said transmission signal an average of N times whereby said second plurality of potential samples for each cycle of said transmission signal are coupled to said second output filter means an average of N times, said second output filter means being responsive to said second plurality of potential samples to construct therefrom an output signal in which each cycle of said transmission signal is repeated an average of N times and wherein the bandwidth of said output signal is substantially equal to the bandwidth of the electrical signal.

3. A system for decreasing the transmission bandwidth of an electrical signal composed of a plurality of cycles, including in combination, clock means for generating a first clock signal having a predetermined rate and a second clock signal having a rate $1/N$ times said predetermined rate, sampling means adapted to receive the electrical signal and coupled to said clock means for receiving said first clock signal, said sampling means being responsive to the electrical signal and said first clock signal to sample at discrete spaced intervals determined by said first clock signal the potential of every Nth cycle of the electrical signal at said predetermined rate to obtain a plurality of discrete samples, memory means coupled to said sampling means and including a plurality of separate storage elements, said memory means acting to store each of said plurality of discrete samples in a separate one of said storage elements, read out means coupled to said clock means for receiving said second clock signal and to said memory means for reading out therefrom said plurality of discrete samples at a rate $1/N$ times said predetermined rate, said read out means further being responsive to said plurality of samples to construct a transmission signal having a waveform substantially the same as said sampled cycle and with a bandwidth $1/N$ times the bandwidth of said sampled cycle.

4. A system for decreasing the transmission bandwidth of an electrical signal composed of a plurality of cycles, including in combination, input means adapted to receive the electrical signal, control signal generation means and sampling means coupled to said input means, memory means coupled to said sampling means, read out means coupled to said memory means, and clock means coupled to said control signal generation means, said sampling means and said read out means, said control signal generation means being responsive to said electrical signal to generate a control signal at the end of each cycle thereof, said clock means being responsive to said control signal to generate a series of fast clock pulses having a predetermined pulse rate during the period of every Nth cycle of the electrical signal, said clock means being further responsive to said fast clock pulses to generate a series of slow clock pulses substantially equal in number to the number of fast clock pulses generated and having a rate equal to $1/N$ times said predetermined pulse rate, said sampling means being responsive to said fast clock pulses and to the potential of every Nth cycle of the electrical signal to couple a plurality of waveform samples to said memory means for storage therein, said read out means being responsive to said slow clock pulses to read out from said memory means said plurality of waveform samples and to construct therefrom a transmission signal having a waveform substantially the same as said sampled cycle and with a bandwidth $1/N$ times the bandwidth of said sampled cycle.

5. A system for decreasing the transmission bandwidth of an electrical signal composed of a plurality of cycles, including in combination, input means adapted to receive the electrical signal, control signal generation means coupled to said input means, a plurality of memory means, a plurality of input gate means each coupling said input means to a separate one of said memory means, output filter means, a plurality of read out gate means each coupling a separate one of said memory means to said output filter means, clock means coupled to said control signal generation means, input ring counter means and output ring counter means each coupled to said clock means and each having a plurality of outputs, each of said plurality of input ring counter means outputs being coupled to a separate one of said plurality of input gate means for sequential actuation thereof, each of said plurality of output ring counter means outputs being coupled to a separate one of said plurality of read out gate means for sequential actuation thereof, said control signal generation means being responsive to said electrical signal to generate a control signal at the end of each cycle thereof, said clock means being responsive to said control signal to generate a series of fast clock pulses having a predetermined pulse rate during the period of every Nth cycle of the electrical signal, said clock means being further responsive to said fast clock pulses to generate a series of slow clock pulses substantially equal in number to the number of fast clock pulses generated and having a pulse rate equal to $1/N$ times said predetermined pulse rate, said input ring counter means being responsive to said fast clock pulses to sequentially open and close said plurality of input gate means whereby a plurality of potential samples of every Nth cycle of the electrical signal are stored each in a separate one of said plurality of memory means, said output ring counter means being responsive to said slow clock pulses to sequentially open and close said plurality of read out gate means to couple said plurality of potential samples from said plurality of memory means to said output filter means, said first output filter means being responsive to said plurality of potential samples to construct therefrom a transmission signal having a waveform substantially the same as said sampled cycle and with a bandwidth $1/N$ times the bandwidth of said sampled cycle.

6. A system for expanding the bandwidth and substantially restoring the waveform of an input electrical signal composed of a plurality of cycles from which every Nth cycle has been selected and the period thereof expanded to a period N times the period of the sampled cycle, including in combination, input means for receiving and translating the expanded electrical signal, control signal generation means and sampling means coupled to said input means, memory means coupled to said sampling means, read out means coupled to said memory means, clock means coupled to said control signal generation means, said sampling means and said readout means, said control signal generation means being responsive to said expanded electrical signal to generate a control signal at the end of each cycle thereof, said clock means being responsive to said control signal to generate a series of slow clock pulses having a predetermined rate and a series of fast clock pulses having a rate equal to N times said predetermined rate during the period the expanded electrical signal is being received, said sampling means being responsive to said slow clock pulses and the potential of every cycle of the expanded electrical signal to couple a plurality of waveform samples to said memory means for storage therein, said read out means including looping control means coupled to said control signal generation means and responsive to said control signal to establish the particular samples of said plurality of waveform samples stored in said memory means which represents the beginning and end of each cycle of said expanded electrical signal, said read out means being responsive to said fast clock pulses to read out an average of N times said plurality of samples representing each cycle of said expanded electrical signal to construct an output signal in which each cycle of the expanded electrical signal is repeated an average of N times and wherein the bandwidth of said output signal is substantially equal to the bandwidth of the input electrical signal.

7. A system for expanding the bandwidth and substantially restoring the waveform of an input electrical signal composed of a plurality of cycles from which every Nth cycle has been selected and the period thereof expanded to a period N times the period of the sample cycle, including in combination, means for receiving and translating the expanded electrical signal, control signal generation means coupled to said input means, a plurality of memory means, a plurality of input gate means each coupling said input means to a separate one of said memory means, output filter means, a plurality of read out gate means each coupling a separate one of said memory means to said output filter means, clock means coupled to said control signal generation means, input ring counter means and output ring counter means each coupled to said clock means and each having a plurality of outputs, each of said plurality of input ring counter means outputs being coupled to a separate one of said plurality of input gate means for sequential actuation thereof, each of said plurality of output ring counter means outputs being coupled to a separate one of said plurality of read out gate means for sequential actuation thereof, said control signal generation means being responsive to said expanded electrical signal to generate a control signal at the end of each cycle thereof, said clock means being responsive to said control signal to generate a series of slow clock pulses having a predetermined pulse rate and a series of fast clock pulses having a rate equal to N times said predetermined pulse rate during the period the expanded electrical signal is being received, said input ring counter means being responsive to said slow clock pulses to sequentially open and close said plurality of input gate means whereby a plurality of potential samples of every cycle of said expanded electrical signal are stored each in a separate one of said plurality of memory means, looping control means coupled to said control signal generation means and said input ring counter means and said output ring counter means, said looping control means being responsive to said control signal and said sequential actuation of said plurality of input gate means to establish the particular outputs of said output ring counter means which represents the beginning and end of each cycle of said expanded electrical signal and to establish a sequence of actuation for said output ring counter means, said output ring counter means being responsive to said series of fast clock pulses to sequentially open and close said plurality of read out gate means representing each cycle of said expanded electrical signal an average of N times whereby said plurality of potential samples for each cycle of said expanded electrical signal are coupled to said output filter means an average of N times, said second output filter means being responsive to said plurality of potential samples to construct therefrom an output signal in which each cycle of said expanded electrical signal is repeated an average of N times and wherein the bandwidth of said output signal is substantially equal to the bandwidth of the input electrical signal.

8. A system for decreasing the transmission bandwidth of an electrical signal composed of a plurality of cycles, including in combination, first clock means for generating a first clock signal having a first predetermined rate and a second clock signal having a rate $1/N$ times said first predetermined rate, first sampling means adapted to receive the electrical signal and coupled to said first clock means for receiving said first clock signal, said first sampling means being responsive to the electrical signal and said first clock signal to sample at discrete spaced intervals determined by said first clock signal the potential of every Nth cycle of the electrical signal at said first predetermined rate to obtain a first plurality of discrete samples, first memory means coupled to said first sampling means and including a plurality of separate first storage elements, said first memory means acting to store each of said first plurality of discrete samples in a separate one of said first storage elements, first read out means coupled to said first clock means for receiving said second clock signal and to said first memory means for reading out therefrom said first plurality of discrete samples at a rate $1/N$ times said first predetermined rate, and to construct therefrom a transmission signal having a waveform substantially the same as said sampled cycle of the electrical signal and with a bandwidth $1/N$ times the bandwidth of said sampled cycle of the electrical signal, transmission means coupled to said first read out means to transmit said transmission signal receiving means coupled to said transmission means for receiving and translating said transmission signal, second clock means for generating a third clock signal having a second predetermined rate and a fourth clock signal having a rate N times said second predetermined rate, second sampling means coupled to said receiving means and said second clock means, said second sampling means being responsive to said transmission signal and said third clock signal to sample at discrete spaced intervals determined by said third clock signal the potential of every cycle thereof at said second predetermined rate to obtain a second plurality of discrete samples, second memory means coupled to said second sampling means and including a plurality of separate second storage elements, said second memory means acting to store each of said second plurality of discrete samples in a separate one of said second storage elements, second read out means coupled to said second clock means for receiving said fourth clock signal and to said second memory means for reading out therefrom said second plurality of discrete samples representing each cycle of said transmission signal an average of N times at a rate N times said second predetermined rate, to construct an output signal in which each cycle of said transmission signal is repeated an average of N times and wherein the bandwidth of said output signal is substantially equal to the bandwidth of the electrical signal.

9. A system for expanding the bandwidth and substantially restoring the waveform of an electrical signal composed of a plurality of cycles from which every Nth cycle has been selected and the period thereof expanded to a period N times the period of the sampled cycle, including in combination, input means for receiving and translating said expanded electrical signal, clock means for generating a first clock signal having a predetermined rate and a second clock signal having a rate N times said predetermined rate, sampling means coupled to said clock means and to said input means and responsive to said expanded electrical signal and said first clock signal to sample at discrete spaced intervals determined by said first clock signal the potential of every cycle thereof at a predetermined rate to obtain a plurality of discrete samples, memory means coupled to said sampling means and including a plurality of separate storage elements, said memory means acting to store each of said plurality of samples in a separate one of said storage elements, read out means coupled to said clock means for receiving said second clock signal and to said memory means for reading out therefrom said plurality of discrete samples representing each cycle of said transmission signal an average of N times at a rate N times said predetermined rate, to construct an output signal in which each cycle of said expanded electrical signal is repeated an average of N times and wherein the bandwidth of said output signal is substantially equal to the bandwidth of the electrical signal.

References Cited

UNITED STATES PATENTS

| | | | |
|---|---|---|---|
| 2,580,685 | 1/1952 | Mathes | 178—6 |
| 2,650,949 | 9/1953 | Veaux | 179—15.55 |
| 2,921,124 | 1/1960 | Graham | 179—15.55 X |
| 2,860,187 | 11/1958 | David et al. | 179—1 X |

ROBERT L. GRIFFIN, Primary Examiner

W. S. FROMMER, Assistant Examiner